United States Patent [19]
Kytle et al.

[11] Patent Number: 5,926,400
[45] Date of Patent: Jul. 20, 1999

[54] APPARATUS AND METHOD FOR DETERMINING THE INTENSITY OF A SOUND IN A VIRTUAL WORLD

[75] Inventors: Kara Kytle, Portland; Mark Leavy, Beaverton, both of Oreg.

[73] Assignee: Intel Corporation, Santa Clara, Calif.

[21] Appl. No.: 08/752,842

[22] Filed: Nov. 21, 1996

[51] Int. Cl.[6] .................................................. G06F 17/50
[52] U.S. Cl. .......................... 364/578; 381/18; 381/182
[58] Field of Search ........................... 364/578; 395/500; 381/17, 61, 26, 24, 77, 85, 90, 18, 182, 79

[56] References Cited

U.S. PATENT DOCUMENTS

| | | | |
|---|---|---|---|
| 4,357,490 | 11/1982 | Dickey | 181/145 |
| 5,046,097 | 9/1991 | Lowe et al. | 381/17 |
| 5,333,202 | 7/1994 | Okaya et al. | 381/24 |
| 5,438,623 | 8/1995 | Begault | 381/17 |
| 5,587,936 | 12/1996 | Levitt et al. | 364/578 |
| 5,633,993 | 5/1997 | Redmann et al. | 395/119 |

OTHER PUBLICATIONS

Wenzel, "The Relative Contribution of Interaural Time and Magnitude Cues to Dynamic Sound Localization", IEEE.

*Primary Examiner*—Kevin J. Teska
*Assistant Examiner*—Thai Phan
*Attorney, Agent, or Firm*—Blakely, Sokoloff, Taylor & Zafman LLP

[57] ABSTRACT

A method for determining the intensity value of a sound begins by determining if a listener location is within one of an ambient ellipse region and a localized ellipse region, the ambient ellipse region and the localized ellipse region sharing a common focus at an origin of the sound and sharing a common medial axis. The intensity value of the sound is set to an ambient intensity value when the listener location is within the ambient ellipse region. The intensity value of the sound is set to a localized intensity value when the listener location is within the localized ellipse region, and the intensity value of the sound is set to zero when the listener location is not within the localized ellipse region or the ambient ellipse region.

15 Claims, 7 Drawing Sheets

APPARATUS AND METHOD FOR DETERMINING THE INTENSITY OF A SOUND IN A VIRTUAL WORLD

BACKGROUND

1. Field of the Invention

The invention relates to the field of virtual reality, and in particular to the rendering of sound in virtual world.

2. Art Background

Modern computer systems can manipulate many forms of information: text, graphics, video, and even sound. Sound is typically stored in a computer system in the form of digital information which can be converted to an analog form recognizable by the human ear. The analog sound is rendered in the physical world through speakers or headphones connected to the computer system, in manners well known in the art.

The volume or intensity of a sound varies according to the location of the listener relative to the origin of the sound. Sounds which originate far away from the listener tend to have less intensity than sounds which originate close by. This decrease in sound intensity with distance from the sound origin is called attenuation. Also, the intensity at which the sound is perceived by each ear on the human head varies according to the orientation of the head relative to the sound source. The variation of sound intensity with distance from the sound source and orientation of the listener is known as sound localization.

Sounds in the real world do not originate from a dimensionless point source. Rather, the source of a sound (such as a bell, for example) has physical dimensions. Within the physical dimensions of the sound source the sound intensity is constant, since it would not be possible in the real world for a listener to "enter" the physical dimensions of the sound source. This region in which the intensity of the sound is perceived as constant is known as the ambient region for the sound, and reflects the fact that sounds originate not from an infinitely small point (a point source), but from a region in space. Furthermore, sounds in the real world have direction; they travel farther in some directions than in others.

Modern computer systems are used to model the physical world through the use of virtual reality technology. Using virtual reality technology, virtual worlds may be created in which a user of the computer system is given the experience of moving through a three-dimensional model of a physical world on the output of the computer system. It is desirable to provide these computer system users with a sound experience to match the visual experience of the virtual world. To provide this sound experience, it is desirable that sounds rendered from the computer system to the users by way of speakers, headphones, or other means reflect characteristics of sounds in the real world. Sounds rendered in a virtual world should have attenuation and direction characteristics which are similar to the attenuation and direction characteristics of sounds in the physical world.

FIG. 1 shows a prior art model for describing the intensity of a sound in a virtual world. The audible zone 110 for the sound (the region in which the sound can be heard) is comprised of a sound origin 100 and a plurality of vectors 130 which define the intensity of the sound along radial vectors originating at the sound origin 100. The audible zone 110 also comprises a plurality of interpolation zones 120 comprising the areas between vectors 130.

Each vector 130 radiates outward from the sound origin 100. The intensity of the sound is localized along the length of the vector 130. Longer vectors indicate that the sound travels farther along the direction of the vector 130. Using a series of vectors to model the sound requires the computer system to store descriptions of each vector 130, which may consume a significant amount of storage space, especially in three dimensions. While interpolation techniques may be used to define the sound intensity in the interpolation zones 120, the complexity of the sound definition is increased by the use of interpolation. It would be desirable to implement a fully parametric model for defining the intensity of a sound for all points in space. A parametric model would have the advantage of being more concise than the vector-based model of FIG. 1, and would not suffer from the added complexity and the need for interpolation.

FIG. 2 shows another prior art model for describing the intensity of a sound in a virtual world, using a cone. The audible zone 210 is comprised of a sound origin 230 and a direction vector 200. The sound origin 230 is located at the point of a cone which defines the audible zone 210. The sound is directed along the axis of the cone, and radiates outward from the axis in a region defined by the volume of the cone. Points farther along the axis (or radially positioned thereabouts) typically exhibit greater sound attenuation than do points closer to the origin. Unfortunately, while a cone offers a good model for the propagation of beams of light, it is less than ideal for modeling the propagation of sound. Sound in the physical world tends to radiate outwardly from its origin in all directions, not just within the volume defined by a cone. Furthermore, although sounds in the physical world propagate in all directions from their origin, they do so asymmetrically. Sounds tend to propagate farther in one direction than in others. For example, the sound of someone's voice will normally propagate farther in the direction which they are facing than it will propagate in the direction behind them. It would be desirable to devise a model for the propagation of sound which accounts for the asymmetrical propagation characteristic of sound in the real world.

FIG. 3 shows another prior art model for describing the intensity of a sound in a virtual world. The first audible zone 310 is conical, and is comprised of a direction vector 300 which originates from a sound origin 340. The sound origin is surrounded by a second audible zone 320 which is spherical in shape. At the intersection of the first and second audible zones is a problem area 330. A sound model combining spheres and cones also has drawbacks. Such a model leads to unnatural sound behaviors, especially in the regions at or close to the problem area 330 where the spherical and cone volumes intersect. Within the problem area 330, the sound is not audible, and yet a small lateral move in either direction places the listener within either the first audible zone 310 or the second audible zone 320, where the sound is heard at or close to full intensity.

It would be desirable to define a parametric model for the intensity of sound in a virtual world which accounts for the directional and localization characteristics of sound in the physical world. The model should be simple and intuitive enough to be easily understood by persons designing virtual worlds.

SUMMARY OF THE INVENTION

Described herein is a method and apparatus for determining the intensity value of a sound. A listener location is tested to determine whether it is within one of an ambient ellipse region and a localized ellipse region, the ambient ellipse region and the localized ellipse region sharing a common focus at an origin of a sound and sharing a common medial axis. The intensity value of the sound is set to an ambient intensity value when the listener location is within the ambient ellipse region. The intensity value of the sound is set to a localized intensity value when the listener location is within the localized ellipse region, and the intensity value of the sound is set to zero when the listener location is not within the localized ellipse region or the ambient ellipse region.

DETAILED DESCRIPTION

Figure 1:
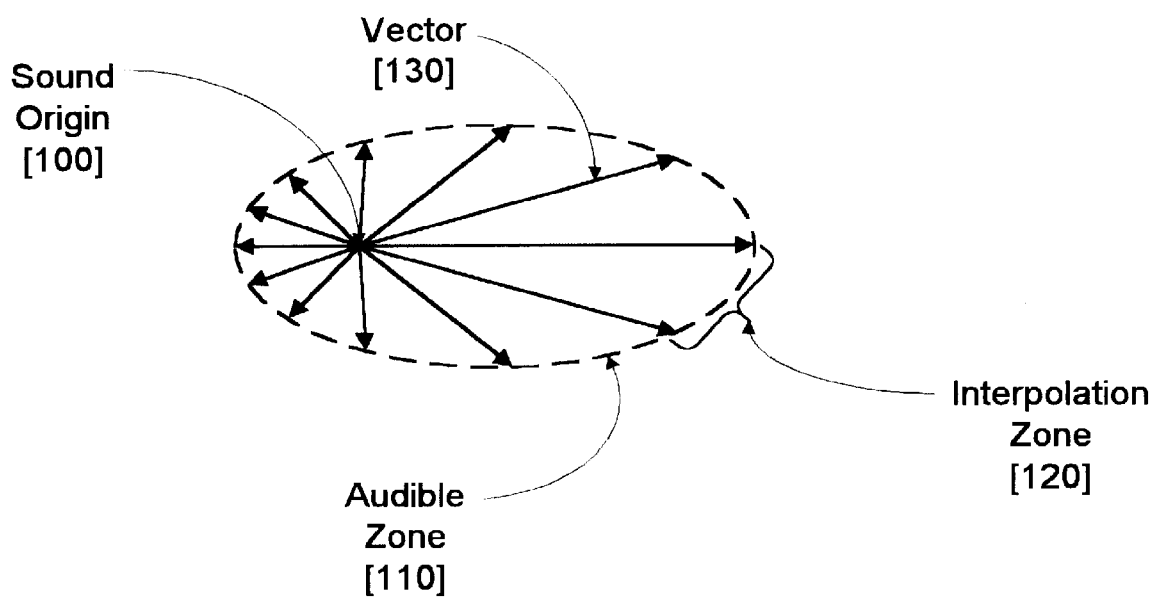
FIG. 1 shows a prior art model for describing the intensity of a sound in a virtual world, using vectors.
Figure 2:
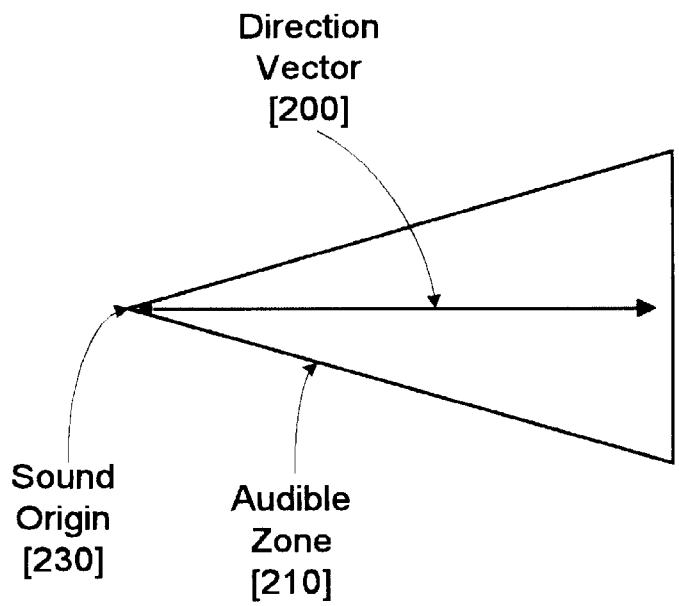
FIG. 2 shows a prior art model for describing the intensity of a sound in a virtual world, using a cone.
Figure 3:
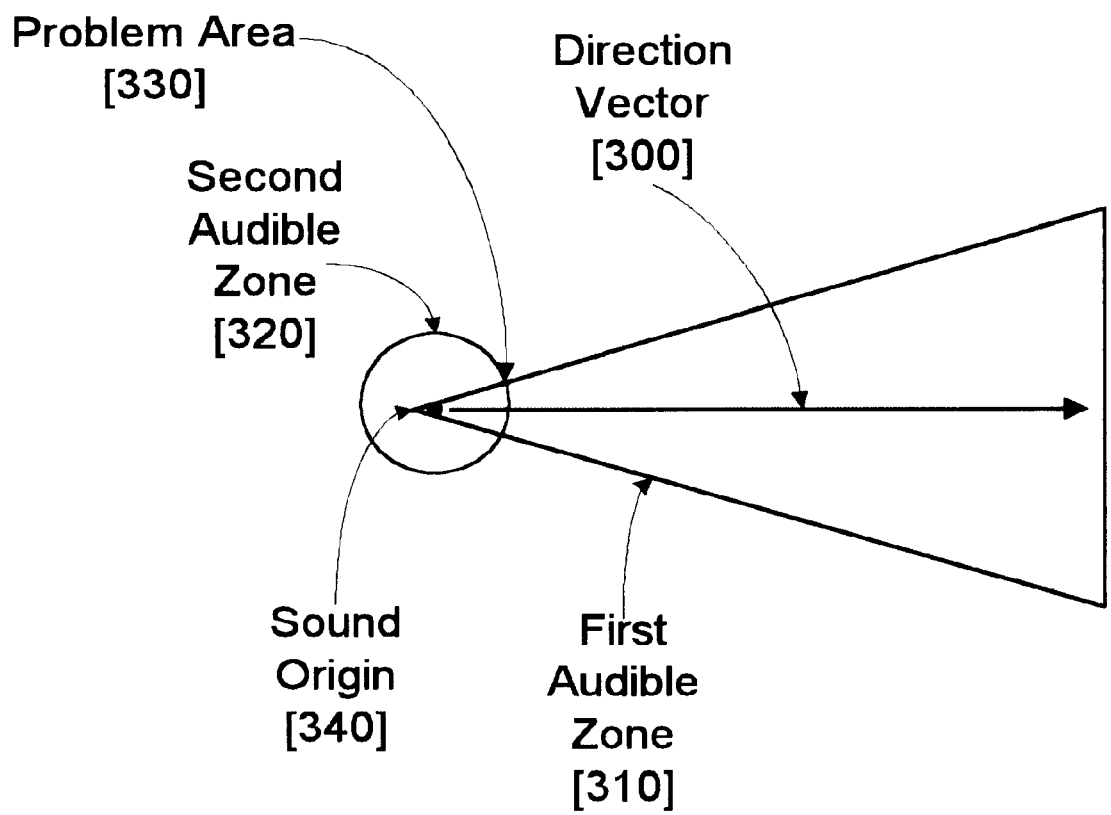
FIG. 3 shows a prior art model for describing the intensity of a sound in a virtual world, using a cone and a sphere.

In the following description, numerous specific details are set forth such as circuits, flow diagrams, etc., in order to provide a thorough understanding of the present invention. In other instances, well-known structures and techniques have not been shown in detail because to do so may obscure the present invention.

The specific arrangements and methods described herein are merely illustrative of the principles of the present invention. Numerous modifications in form and detail may be made by those of ordinary skill in the art without departing from the scope of the present invention. For example, while the invention is illustrated in two dimensions, it is equally applicable in three dimensions.

The present invention involves specifying the sound origin as a focus of two ellipses (ellipsoids, in three dimensions). Mathematically, the shape of an ellipse may be fully defined by specifying its front and back extents, one focus point, and the direction of its medial axis. The two ellipses represent the audible zones for the sound, and are specified using several parameters. Both ellipses share a focus value at the sound origin. Each has an axis along the primary direction in which the sound travels. Each ellipse has a back and front range value which specify the ellipse endpoints. Thus, both ellipses may be specified using a total of at most six parameters: 1) the sound origin, which is also a focus of each ellipse, 2) a maximum front extent for each ellipse, 3) a maximum back extent for each ellipse, and 4) the direction of the medial axis. Even fewer parameters may describe both ellipses when the two ellipses share one or more front or back extent values. Parameters other than the front and back extent may be used to describe the ellipses (for example, the second foci of each ellipse may be used instead), so long as the ellipses share a common focus at the sound origin and a medial axis.

One ellipse is called the ambient ellipse, and is contained inside the second (outer) ellipse. Within the ambient ellipse, the sound has an ambient (maximum, constant) intensity. In the area within the outer ellipse but outside the inner ellipse (between the inner and outer ellipses), the sound is localized. In one embodiment, at the border of the outer ellipse the sound intensity is attenuated −20 dB from the ambient sound intensity. Outside the outer ellipse, the sound intensity is zero.

The model described above allows persons designing virtual worlds to model the sound behavior in simple, intuitive terms. The designer of the virtual world need only pick a point for the origin of the sound and then determine how far in front of the origin the sound be heard, and how far in back of the origin the sound will be heard. The designer then determines if the sound will have an ambient intensity within some region, and defines the front and back extent of this ambient region. If the sound is localized outside the ambient region, the front and back extents of a second (attenuation) ellipse containing the ambient ellipse are defined. The two ellipses provide a natural parametric definition of the sound's behavior for a listener located anywhere in the virtual world. No collection of vectors is required to define the sound's intensity, and no discontinuities are introduced (as they are when using a combination of cones and spheres to model the sound behavior). The sound behaves in a manner similar to sound behavior in the physical world, propagating outward from the sound origin in an (possibly) asymmetrical fashion.

The ambient ellipse defines the dimensions of the sound source. For example, the ambient region could define a collection of bells, each bell at a different location in space, but acting collectively as a single source of sound. In this case, the sound origin is the point which describes the 'center' of the distributed sound source for modeling purposes (i.e. were the distributed source of sound replaced with an equivalent point source of sound, the point source of sound would be located at the sound origin). For point (dimensionless) sound sources, the ambient region may be eliminated.

Figure 4A:
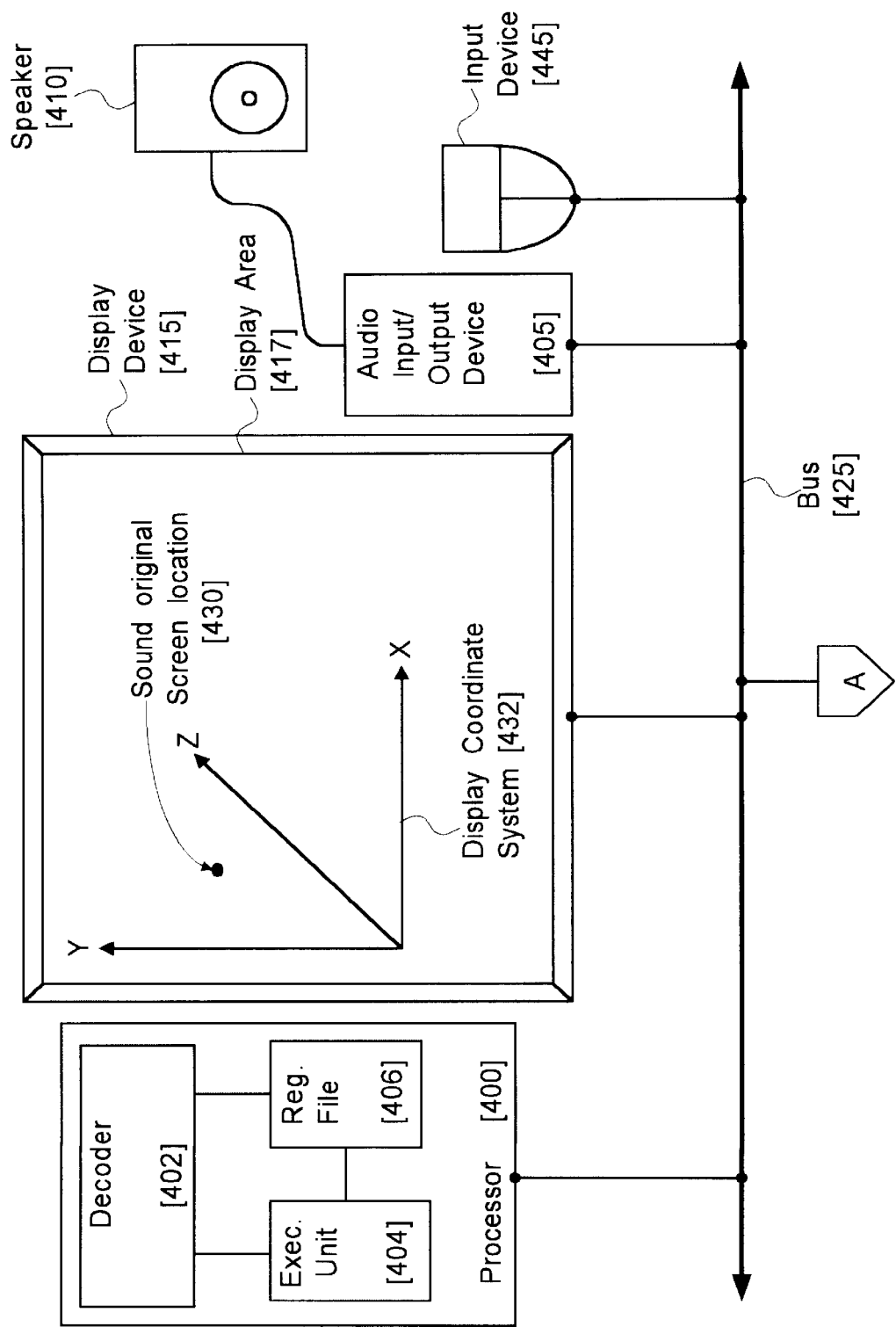
FIGS. 4a and 4b illustrates a computer system utilizing one embodiment of the present invention.
Figure 4B:
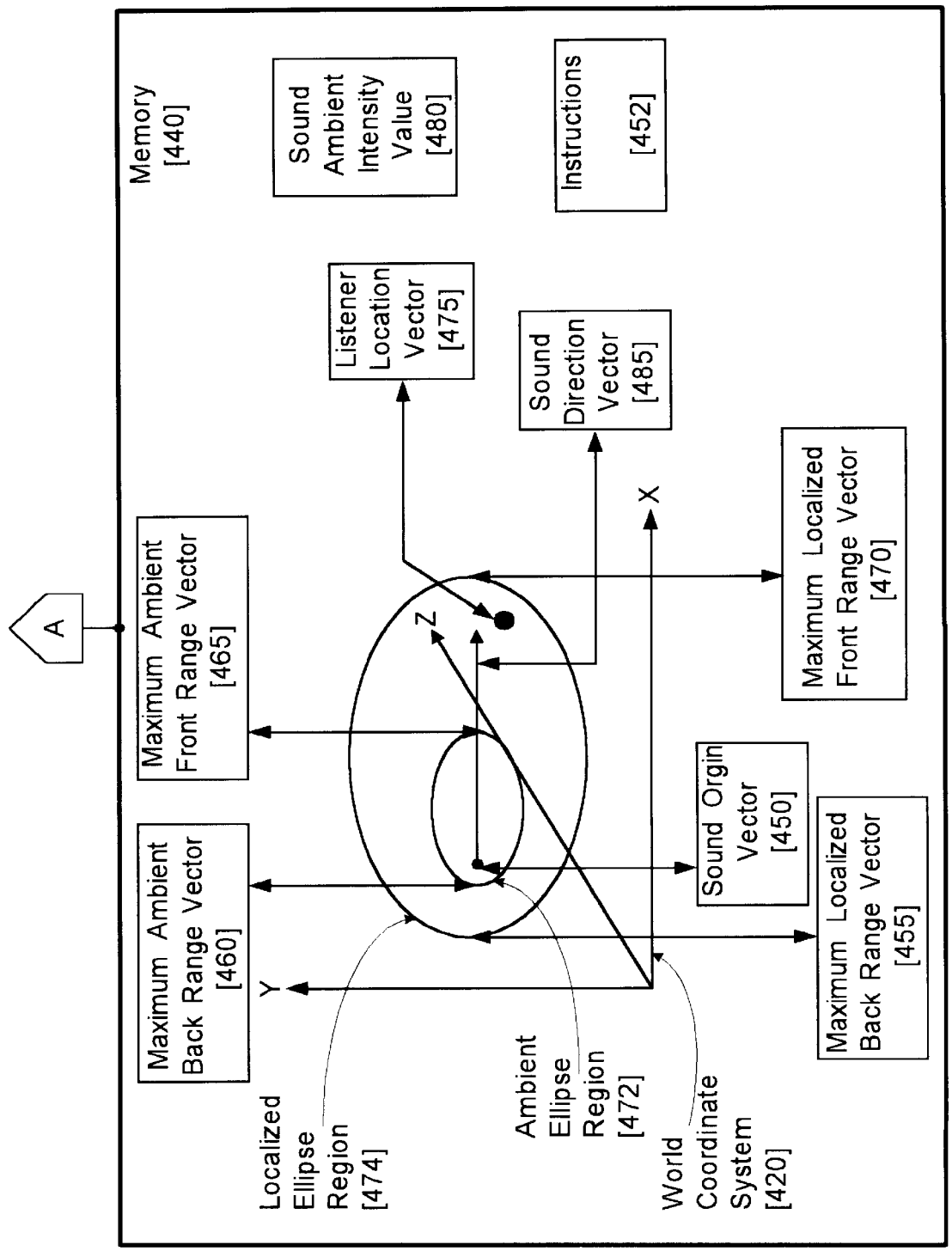

FIG. 4 illustrates a computer system utilizing an embodiment of the present invention. In FIG. 4, a memory 440 stores a plurality of parameters for describing the intensity of a sound at any location within a virtual world. The figure shows the parameters stored as "vectors". The vectors in the figure represent three dimensional points in the virtual world (except for the sound direction vector 485, which represents a direction). These "vectors" should not be confused with the sound propagation vectors of FIG. 1. In FIG. 1 the vectors represented the directions of propagation for the sound. In FIG. 4, the vectors, with one exception, define points for a parametric definition for the two ellipses.

The memory 440 represents one or more mechanisms for storing data. For example, the memory 440 may include machine-readable mediums such as read only memory (ROM), random access memory (RAM), magnetic disk storage mediums, optical storage mediums, flash memory devices, and/or other machine-readable mediums. The memory 440 is coupled to a processor 400 by way of a bus 425. The bus 425 represents one or more busses (e.g., Peripheral Component Interconnect (PCI) bus, Industry Standard Architecture (ISA) bus, X-Bus, Extended Industry Standard Architecture (EISA) bus, Video Electronics Standard Association (VESA) bus, optical coupling, etc.). The processor 400 represents a central processing unit of any type of architecture, such as Complex Instruction Set Computer (CISC), Reduced Instruction Set Computer (RISC), Very Long Instruction Word (VLIW), or a hybrid architecture. In addition, the processor 400 could be implemented on one or more chips.

Using the bus 425, the processor 400 accesses the various elements stored in the memory 440. The processor 400 contains a decoder 407 for decoding instructions, a register file 406 for storing the operands and results of executing instructions, and an execution unit 404 for executing instructions. Of course, the processor 400 contains additional circuitry which is not necessary to understand the invention. The decoder 407 is coupled to the bus 425, and the register file 406 is coupled to the decoder 407. The execution unit 404 is coupled to decoder 407 and the register file 406. The instructions 452 are accessed from the memory 440 and decoded by the decoder 407, and the operands of the instructions 452 are often made available to the execution unit 404 via the register file 406. The register file 406 contains data registers to store arguments for the instructions 452. The processor 400 may contain status registers, control registers, and address registers for controlling the execution of the received instructions. The decoder may be implemented using hard-wired circuitry, a Programmable-Gate-Array, a microcoded ROM, or by any other method known in the art. While this embodiment is described in relation to a single processor computer system, the invention could be implemented in a multi-processor computer system.

A user input device 445 such as a keyboard or a mouse, is also coupled to the bus 425. A display device 416 coupled to the bus 425 displays information to a user of the computer system. The display device can include a display memory, a cathode ray tube (CRT), or a flat panel display, among other technologies. The display device 416 includes a display area 417 for displaying, among other things, a visual representation of a virtual world. For purposes of illustration, the displayed virtual world is shown having a display coordinate system 432, and a sound origin screen location 430 and a listener screen location 435. The purpose of each of these screen elements is explained below.

An audio input/output device 405 is coupled to the bus 425 and provides for the input and output of audio information from the computer system. The audio input/output device 405 is coupled to a speaker 410 to convert audio information output from the computer system into sound. The audio input/output device 405 may also coupled to a microphone (not shown) to convert sound into audio information for input by the computer system.

The memory 440 is comprised of a series of parameters for describing the intensity of a sound anywhere within a virtual world, as well as instructions 452 to perform computations using those parameters. The parameters include a sound origin vector 450, a maximum ambient back range vector 460, a maximum ambient front range vector 465, a maximum localized back range vector 455, and a maximum localized front range vector 470. Each of these parameters describes a point in a world coordinate system 420. The memory also comprises a parameter for a sound direction vector 485, which describes a direction in the world coordinate system 420. The memory 440 further comprises a sound intensity value 480 and a listener location vector 475. The listener location vector 475 describes the location of someone who is interacting with the virtual world, as explained below. In other embodiments, different parameters may be used to describe the two ellipses, provided that the ellipses share a common focus which is also the sound origin, and the ellipses share a medial axis.

As illustrated in the figure, the sound origin vector 450 is used as a focus of an ambient ellipse region 472 and a localized ellipse region 474. The sound direction vector 485 describes the primary direction of propagation for the sound (the direction in which it propagates farthest) and also serves as the axis for both ellipses. The maximum ambient back range vector 460 and the maximum ambient front range vector 465 define the endpoints of the ambient ellipse region 472 and thus define the extent of the region in which the sound has the ambient intensity value 480. The maximum localized back range vector 460 and the maximum localized front range vector 465 define the endpoints of the localized ellipse region 474 and thus define the extent of the region in which the sound is localized. In the region between the boundary of the ambient ellipse region 472 and the localized ellipse region 474, the sound intensity is localized. Outside of the localized ellipse region 474, the sound intensity is zero.

The listener location vector 475 defines the location of a listener in the virtual world. The listener location vector 475 is typically updated in response to signals from the input device 445, and may move in, around, or through the audible zones for the sound described by the ambient ellipse region 472 and the localized ellipse region 474. The processor 400 is typically used to update the listener location vector 475 in memory 440, in response to the signals from the input device 445.

In a typical application of the present invention, a user of the computer system manipulates the input device 445 to change his or her location in a virtual world displayed on the display area 417 of the display device 415. A display coordinate system 432 provides the visual reference frame for the virtual world on the display area 417 of the display device 415. Manipulating the input device 445 causes signals to be sent to the processor 400 by way of the bus 425. The processor interprets these signals to update the listener location vector 475 in the memory 440.

The sound origin vector 450 is translated from the world coordinate system 420 to the screen coordinate system 432. The translated sound origin vector 450 is represented by a sound origin screen location 430 relative to the display coordinate system 432. The process of translating a point in a world coordinate system 420 to a display coordinate system 432 is well known in the art. For example, most graphical user interfaces for computer systems perform such translations.

By manipulating the input device 445 to update the listener location vector 475, the user of the computer system can gain the experience of moving relative to the sound origin screen location 430. As the user does so, computations are done using the execution unit 404 of the processor 400 to determine which, if any, audible zone the listener location vector has entered. These computations may involve reading one or more of the parameters describing the ambient ellipse region 472 and the localized ellipse region 474 from the memory 440 to the register file, and also reading the listener location vector 475 from the memory 440 to the register file. This information is acted upon by instructions 452 decoded by the decoder 407 of the processor to determine whether the listener location vector 475 is within the ambient ellipse region 472, the localized ellipse region 474, or neither. If the listener location vector 475 is within the ambient ellipse region 472, the sound is output to the audio output device 405 to play on the speaker 410, using the sound ambient intensity value 480. If the listener location vector 475 is within the localized ellipse region 474 but not within the ambient ellipse region 472, the sound is output to the audio output device 405 to play on the speaker 410, using a sound intensity which is localized according to a localization computation. The localization computation can take the form of attenuation as a function of distance from the sound origin, localization according to listener orientation relative to the sound source, or other localization computations, the details of which are not necessary to an understanding of the invention. If the listener location vector 475 is outside the localized ellipse region, the sound is not output to the audio output device 405.

The invention simplifies the description of the intensity of a sound relative to a listener anywhere in a virtual world, by requiring typically fewer parameters than the vector based model. It is more flexible than the cone model and does not suffer from the discontinuities inherent in the hybrid model. Using ellipses results in a more natural sound behavior than using cones or a combination of cones and spheres, because there are no discontinuities in the sound behavior. Between the outer and inner ellipses, the sound intensity is localized as the listener moves closer to or around the sound origin. There are no regions through which the user may move which cause an abrupt discontinuity in sound intensity.

Other embodiments are possible without departing from the scope of the invention. For example, the maximum front and back ranges for the ambient region could be set to equal values. Likewise, the maximum front and back ranges for the localized region could be set to equal values. When this is done, the sound corresponds to a point source of sound which propagates equally in all directions (is undirected). The ambient and localized ellipses degenerate to circles (or spheres, in three dimensions). Also, the maximum ambient back and front range vectors 460, 465 may be set equal to the maximum localized back and front range vectors 455, 470. This corresponds to the simple case of a sound which is audible at ambient intensity within a certain region and inaudible elsewhere. Finally, other parametric models may be used, so long as the two ellipses share a focus at the sound origin and a common medial axis.

The model described above is flexible enough to model the simple case in which the sound has a constant value within a defined region and is inaudible elsewhere. To model this case, the ambient and localized ellipses are exactly overlapped and the region between the ellipses is eliminated.

In summary, the sound intensity has a constant value within the ambient ellipse region 472. Between the ambient and localized ellipse boundaries, the sound intensity is localized. Outside the boundary of the localized ellipse region 474, the intensity of the sound is zero. More elongated ellipses result in a more directional sound (such as might occur when speaking through a megaphone), while more squat ellipses result in a less directional sound.

Figure 5:
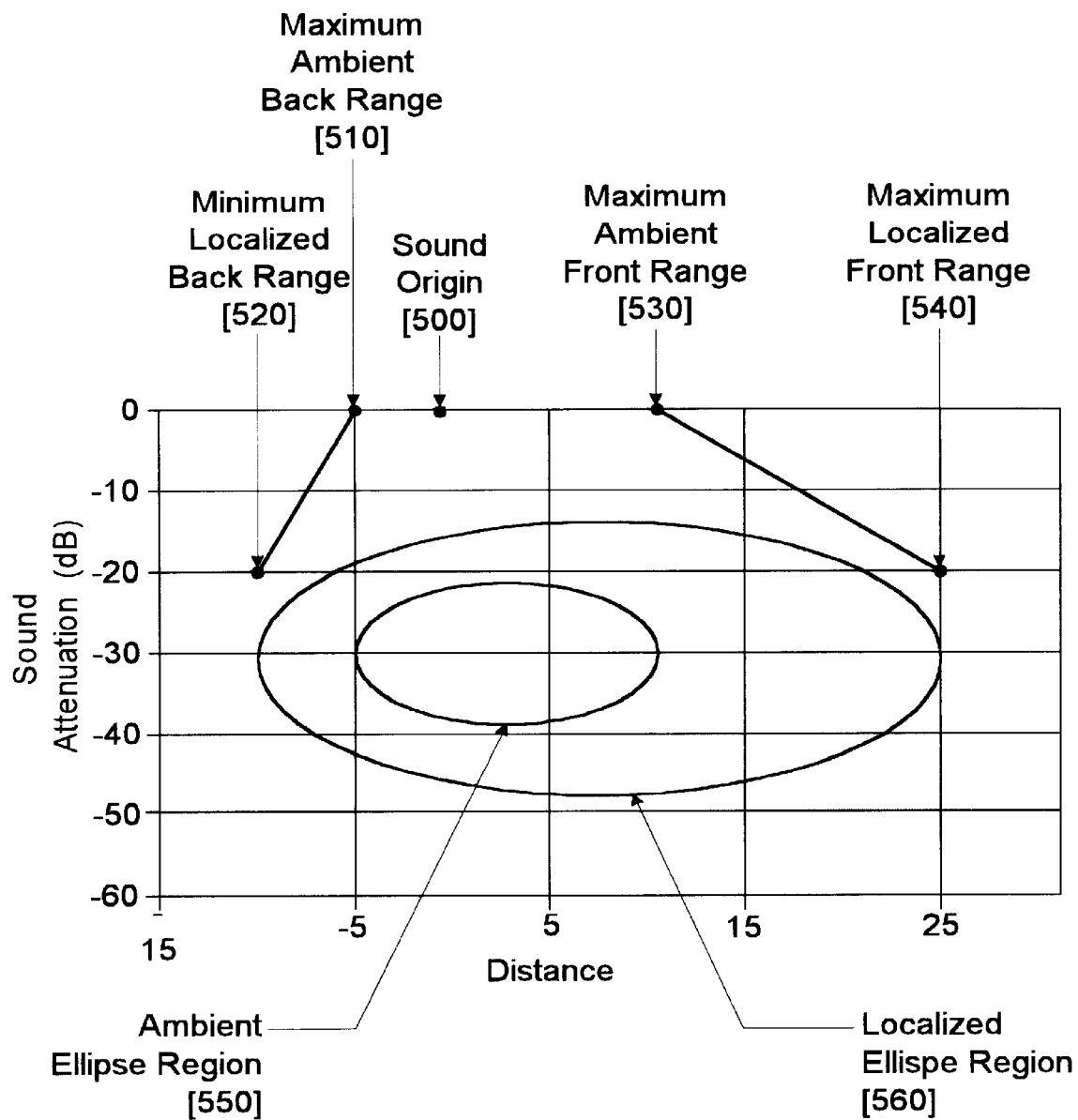
FIG. 5 shows a graph of sound attenuation with distance using the present invention.

FIG. 5 shows a graph of sound attenuation over distance using one embodiment the present invention. As previously noted, attenuation is one form of localization which may be applied in the localized ellipse region. The x-axis of the graph is a measure of the distance from the sound origin 500. The y-axis of the graph is a measure of the attenuation of the intensity of the sound. As the graph demonstrates, the intensity of a sound, originating at a sound origin 500, attenuates from an ambient value (0 attenuation) at the maximum ambient back range 510 of the ambient ellipse region 550 to −20 dB at the maximum localized back range 520 of the localized ellipse region 560. The intensity of the sound attenuates from an ambient value (0 attenuation) at the maximum ambient front range 530 of the ambient ellipse region 550 to −20 dB at the maximum localized front range 540 of the localized ellipse region 560. Within the ambient ellipse region 550, the attenuation is 0. Likewise, the sound intensity attenuates −20 dB from any point on the border of the ambient ellipse region 550 to any point on the border of the localized ellipse region 560.

Figure 6A:
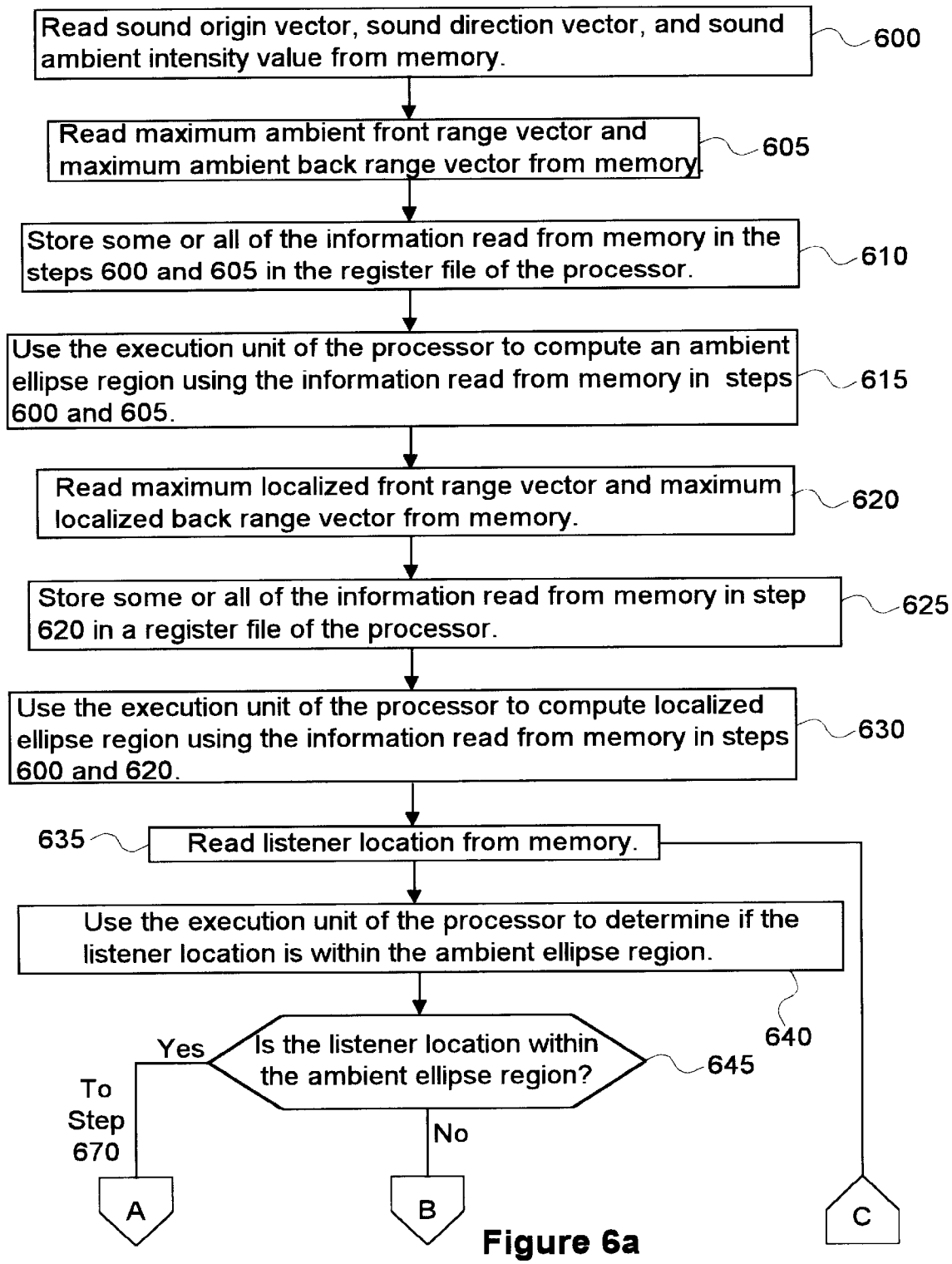
FIGS. 6a and 6b illustrates a method for determining the intensity of a sound in a virtual world.
Figure 6B:
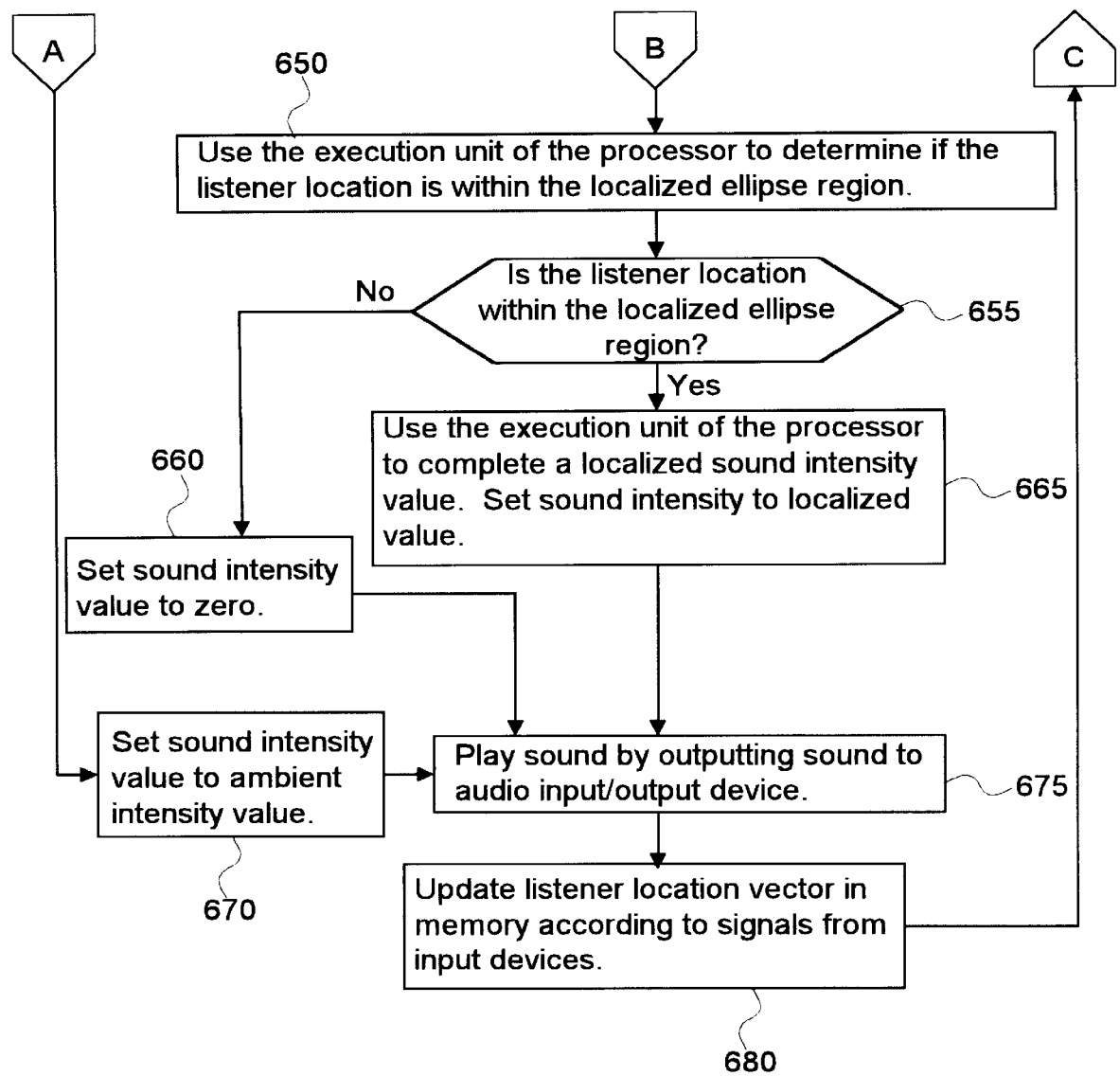

FIG. 6 illustrates a method for determining the intensity of a sound in a virtual world. The sound origin vector, sound direction vector, and sound ambient intensity value are read from memory at step 600. After reading the sound origin, direction, and ambient intensity values from memory, the next step is reading the maximum ambient front range vector and maximum ambient back range vector from memory at step 605. Some or all of the information read from memory at steps 600–605 is stored in the register file of the processor at step 610. After storing some or all of the values in the register file, the next step is using the execution unit of the processor to compute an ambient ellipse region at step 615, using the information read from memory in steps 600–605. The maximum localized front range vector and the maximum localized back range vector are then read from memory at step 620.

After reading the maximum localized front and back range vectors from memory, the next step is to store some or all of the information read from memory in the previous step to the register file of the processor at step 625. At step 630, the execution unit of the processor is used to compute a localized ellipse region using the information read from memory in steps 600 and 620.

After computing the localized ellipse region, the next step is reading the listener location vector from memory at step 635. The execution unit of the processor is used to determine if the listener location vector is within the ambient ellipse region at step 640. A decision is made at step 645. If the listener location is within the ambient ellipse region, the sound intensity value that the listener hears is set to the ambient intensity value for the sound at step 670. If the listener location is not within the ambient ellipse region, the execution unit of the processor is used to determine if the listener location is within the localized ellipse region at step 650.

A decision is made at step 655. If the listener location is within the localized ellipse region, then at step 665 the execution unit of the processor is used to compute a localized sound intensity value and set the sound intensity to the computed value. If the listener location is not within the localized ellipse region, then at step 660 the sound intensity value is set to zero because the listener is outside the localized ellipse region.

After determining the sound intensity value, the next step is to play the sound by outputting the sound and the sound intensity value to the audio input/output device at step 675. The listener location vector is then updated in memory according to signals from the input device at step 680. Control then returns to step 635 where the (updated) listener location vector is again read from memory.

Other embodiments are possible without departing from the scope of the invention. For example, after computing the ambient and localized ellipse regions and reading the listener location value from memory, it is possible to first determine if the listener location is outside the localized ellipse region. Next, the listener location value can be tested to determine whether it is within the ambient ellipse region. If the listener location is not outside the localized ellipse region or inside the ambient ellipse region, it is within the localized ellipse region. The sound intensity value is set accordingly.

In another embodiment, if the maximum front and back range values are the same for both the ambient and localized ellipses, then the sound is an ambient sound and no localized region is necessary. In this case, the listener location need only be tested for inclusion in the ambient ellipse region.

In conclusion, the invention improves the determination of the intensity of a sound in a virtual world by simplifying the amount of information necessary to describe the sound intensity at all locations in the virtual world, and by eliminating regions of non-intuitive sound behavior.

Although this invention has been shown in relation to a particular embodiment, it should not be considered so limited. Rather, the invention is limited only by the scope of the appended claims.

What is claimed is:

1. A method for determining the intensity value of a sound, the method comprising the computer-implemented steps of:
   determining if a listener location is within one of an ambient ellipse region and a localized ellipse region, the ambient ellipse region and the localized ellipse region sharing a common focus at an origin of a sound and sharing a common medial axis;
   setting a sound intensity value to an ambient intensity value when a listener location is within the ambient ellipse region;
   setting the sound intensity value to a localized intensity value when the listener location is within the localized ellipse region; and
   setting the sound intensity value to zero when the listener location is not within the localized ellipse region or the ambient ellipse region.

2. The method of claim 1 further comprising the computer-implemented steps of:
   computing the ambient ellipse region using a sound origin value, a sound direction value, a maximum ambient front range value, and a maximum ambient back range value; and
   computing the localized ellipse region using the sound origin value, the sound direction value, a maximum localized front range value, and a maximum localized back range value.

3. The method of claim 2 in which the maximum localized front range value is equal to the maximum ambient front range value, and the maximum localized back range value is equal to the maximum ambient back range value.

4. The method of claim 1 further comprising the computer-implemented steps of:
   setting the intensity of the sound to the sound intensity value; and
   outputting the sound to an audio output device for playing.

5. The method of claim 1 further comprising the computer-implemented steps of:
   updating the listener location according to signals from an input device.

6. A computer software product that includes a medium readable by a processor, the medium having stored thereon:
   parameters for defining an ambient ellipse region and a localized ellipse region, the ambient ellipse region and the localized ellipse region sharing a common focus at an origin of a sound and sharing a common medial axis;
   a sequence of instructions, which, when executed by the processor, causes said processor to
   compute said ambient and localized ellipse regions using said parameters;
   set a sound intensity value to an ambient intensity value when a listener location is within the ambient ellipse region;
   set the sound intensity value to a localized intensity value when the listener location is within the localized ellipse region; and
   set the sound intensity value to zero when the listener location is not within the localized ellipse region or the ambient ellipse region.

7. The computer software product of claim 6 in which the parameters for defining said ambient and localized ellipse regions consist of an ambient intensity value, a sound origin value, a sound direction value, a maximum ambient front range value, a maximum ambient back range value, a maximum localized front range value, and a maximum localized back range value.

8. The software product of claim 7 in which the maximum ambient front range value and the maximum ambient back range value are stored using a single value, causing the ambient ellipse region to become a sphere.

9. The software product of claim 7 in which the maximum localized front range value and the maximum localized back range value are stored using the same two values as the maximum ambient front range value and the maximum ambient back range value, respectively, causing the localized ellipse region to become the ambient ellipse region.

10. A computer system comprising:
    a processor; and
    a storage area coupled to the processor, the storage area having stored therein parameters for defining an ambient ellipse region and a localized ellipse region, the ambient ellipse region and the localized ellipse region sharing a common focus at an origin of a sound and sharing a common medial axis;
    said storage area having further stored therein sequences of instructions which, when executed by the processor, cause the processor to
    compute said ambient and localized ellipse regions using said parameters;
    set a sound intensity value to an ambient intensity value when a listener location is within the ambient ellipse region;
    set the sound intensity value to a localized intensity value when the listener location is within the localized ellipse region; and
    set the sound intensity value to zero when the listener location is not within the localized ellipse region or the ambient ellipse region.

11. The computer system of claim 10 is which said parameters consist of an ambient intensity value, a sound origin value, a sound direction value, a maximum ambient front range value, a maximum ambient back range value, a maximum localized front range value, and a maximum localized back range value.

12. The computer system of claim 11 in which the maximum ambient front range value and the maximum ambient back range value are stored using a single value, causing the ambient ellipse region to become a sphere.

13. The computer system of claim 11 in which the maximum localized front range value and the maximum localized back range value are stored using the same two values as the maximum ambient front range value and the maximum ambient back range value, respectively, causing the localized ellipse region to become the ambient ellipse region.

14. The computer system of claim 11 further comprising:
    an audio output device for playing the sound at the sound intensity value.

15. The computer system of claim 12 further comprising:
    an input device for updating said listener location.

* * * * *